US010683088B2

(12) United States Patent
Erickson et al.

(10) Patent No.: US 10,683,088 B2
(45) Date of Patent: Jun. 16, 2020

(54) UNMANNED AERIAL VEHICLE FOR CROWD VISUAL FEEDBACK

(71) Applicant: INTERNATIONAL BUSINESS MACHINES CORPORATION, Armonk, NY (US)

(72) Inventors: Thomas D. Erickson, Minneapolis, MN (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 15/167,425

(22) Filed: May 27, 2016

(65) Prior Publication Data

US 2017/0341746 A1 Nov. 30, 2017

(51) Int. Cl.
*B64C 39/00* (2006.01)
*B64C 39/02* (2006.01)
*G06N 7/00* (2006.01)

(52) U.S. Cl.
CPC .......... *B64C 39/024* (2013.01); *G06N 7/005* (2013.01); *B64C 2201/12* (2013.01); *B64C 2201/127* (2013.01)

(58) Field of Classification Search
CPC .......... B64C 39/024; B64C 2201/108; B64C 2201/127; B64C 2201/145; B64D 47/02; B64D 47/08; G06N 7/005

(Continued)

(56) References Cited

U.S. PATENT DOCUMENTS 5,832,187 A * 11/1998 Pedersen ................ G06Q 10/06
706/45
7,961,906 B2 * 6/2011 Ruedin ................ G06K 9/6289
382/103

(Continued)

FOREIGN PATENT DOCUMENTS

CN 201242805 Y 5/2009
CN 103686601 A 3/2014

(Continued)

OTHER PUBLICATIONS

Baig, M. W. et al., "Crowd Emotion Detection Using Dynamic Probabilistic Models," From Animalsto Animats 13: 13th International Conference on Simulation of Adaptive Behavior, Jul. 2014. (pp. 1-351).

(Continued)

*Primary Examiner* — Sheikh Maruf
(74) *Attorney, Agent, or Firm* — Tutunjian & Bitetto, P.C.; Anthony Curro

(57) ABSTRACT

An unmanned aerial vehicle for providing ameliorative action. The unmanned aerial vehicle includes a processor-based monitoring device to monitor a plurality of individuals to determine crowd data associated with the plurality of individuals, a crowd estimator configured to receive the crowd data to estimate a crowd pressure estimation value indicative of a likelihood of a crowd event, the crowd pressure estimation value being based on the crowd data, and an ameliorative action generator to automatically perform a function when the crowd pressure estimation value exceeds a predetermined threshold value, wherein the function includes activating one or more feedback outputs configured to provide an ameliorative action.

20 Claims, 8 Drawing Sheets

(58) Field of Classification Search
USPC .......................................................... 706/52
See application file for complete search history.

(56) References Cited

U.S. PATENT DOCUMENTS

| | | | |
|---|---|---|---|
| 8,777,157 B2 | 7/2014 | Barrett et al. | |
| 9,051,043 B1* | 6/2015 | Peeters | B64C 19/00 |
| 9,952,594 B1* | 4/2018 | Zhao | G05D 1/0094 |
| 2007/0118494 A1* | 5/2007 | Jannarone | G06N 20/00 706/52 |
| 2007/0235041 A1 | 10/2007 | Grande | |
| 2010/0138378 A1* | 6/2010 | Jannarone | G06N 20/00 706/52 |
| 2011/0273324 A1* | 11/2011 | Petillon | G01S 13/878 342/118 |
| 2013/0080376 A1* | 3/2013 | Yao | G06N 3/0436 706/52 |
| 2014/0142787 A1* | 5/2014 | Tillotson | G05D 1/101 701/3 |
| 2015/0336667 A1* | 11/2015 | Srivastava | B64C 39/024 701/2 |
| 2015/0379874 A1* | 12/2015 | Ubhi | G01S 5/0027 701/3 |
| 2016/0016663 A1* | 1/2016 | Stanek | B60R 16/02 701/3 |
| 2016/0070970 A1* | 3/2016 | Salahat | H04N 7/18 382/195 |
| 2016/0070975 A1* | 3/2016 | Salahat | G06K 9/4671 382/195 |
| 2016/0297521 A1* | 10/2016 | Cheatham, III | B64C 39/024 |
| 2016/0328979 A1* | 11/2016 | Postrel | B64C 39/024 |
| 2016/0340006 A1* | 11/2016 | Tang | B63C 9/01 |
| 2016/0355257 A1* | 12/2016 | Chappell | B64C 39/024 |
| 2016/0370863 A1* | 12/2016 | Jones | G06F 3/016 |
| 2017/0017853 A1* | 1/2017 | Alyammahi | G06K 9/00986 |
| 2017/0019644 A1* | 1/2017 | K V | B64C 39/024 |
| 2017/0069214 A1* | 3/2017 | Dupray | G08G 5/0021 |
| 2017/0073070 A1* | 3/2017 | Xing | B64C 39/024 |
| 2017/0127257 A1* | 5/2017 | Saxena | H04W 4/023 |
| 2017/0134963 A1* | 5/2017 | Priest | H04W 16/18 |
| 2017/0137124 A1* | 5/2017 | Walker | G08B 25/10 |
| 2017/0139420 A1* | 5/2017 | Lockwood | B60R 16/02 |
| 2017/0139421 A1* | 5/2017 | Lockwood | B60R 16/02 |
| 2017/0140655 A1* | 5/2017 | Erickson | G08G 5/0039 |
| 2017/0166308 A1* | 6/2017 | Desrochers | B64D 1/08 |
| 2017/0182406 A1* | 6/2017 | Castiglia | G06K 9/00778 |
| 2017/0185867 A1* | 6/2017 | Lee | G06K 9/0063 |
| 2017/0190421 A1* | 7/2017 | Diez-Garias | A63H 27/12 |
| 2017/0270314 A1* | 9/2017 | Tsybrovskyy | G06F 21/6227 |
| 2017/0329351 A1* | 11/2017 | Park | A01B 79/005 |
| 2017/0341746 A1* | 11/2017 | Erickson | B64C 39/024 |
| 2017/0358228 A1* | 12/2017 | Priest | G08G 5/045 |
| 2018/0019801 A1* | 1/2018 | Dowlatkhah | H04B 7/18506 |
| 2019/0107845 A1* | 4/2019 | Kaine | G05D 1/104 |

FOREIGN PATENT DOCUMENTS

| | | |
|---|---|---|
| CN | 104318712 A | 1/2015 |
| EP | 2008026 B1 | 3/2014 |
| WO | WO2014117145 A1 | 7/2014 |

OTHER PUBLICATIONS

Graham, R., "The Hajj Stampede: Why do Crowds Run?" The Atlantic, Sep. 2015. (pp. 1-5).

Helbing, D., "Social Self-Organization: Agent-Based Simulations and Experiments to Study Emergent Social Behavior," Springer, May 2012. (pp. 1-343).

Katona, Z. et al., "Network Effects and Personal Influences: The Diffusion of an Online Social Network," Journal of Marketing Research, vol. 48, No. 3, Jun. 2011. (pp. 1-20).

Moussaid, M. et al., "How simple rules determine pedestrian behavior and crowd disasters," PNAS, vol. 108, No. 17, Apr. 2011 (pp. 1-5).

Rogers, A., "The Hajj Stampede Is a Fluid Dynamics Problem," Science, Sep. 2015. (pp. 1-12). Available at: http://www.wired.com/2015/09/hajj-stampede-fluid-dynamics-problem/.

Schavemaker, J. et al., "SWEET Demonstrator: A Crowd Emotion Monitor," MeasuringBehavior.org, Copyright 2016. (pp. 1-7) Available at: http://www.measuringbehavior.org/mb2014/sweet-demonstrator/join-crowd-emotion-monitor.

Wirz, M. et al., "Probing crowd density through smartphones in city-scale mass gatherings," EPJ Data Science, vol. 2. No. 5, Dec. 2013. (pp. 1-24).

Wollan, M., "How to Survive a Stampede," The New York Times Magazine, Nov. 2015. (pp. 1-2).

* cited by examiner

UNMANNED AERIAL VEHICLE FOR CROWD VISUAL FEEDBACK

BACKGROUND

Technical Field

The present invention relates generally to an unmanned aerial vehicle and, in particular, to an unmanned aerial vehicle for providing crowd control ameliorative action.

Description of the Related Art

A crowd stampede is generally an uncontrolled movement of a crowd of people. During such an event, several individuals may be compressed into a small area often creating shockwaves. Crowd management strategies may be implemented to provide traffic control to coordinate crowd movement, widen bottleneck areas (e.g., doorways), and employ various devices, such as barrier fencing, exit signage, and push bars on outward opening doors.

SUMMARY

According to an aspect of the present principles, an unmanned aerial vehicle for providing ameliorative action is provided. The unmanned aerial vehicle may include a processor-based monitoring device to monitor a plurality of individuals to determine crowd data associated with the plurality of individuals, a crowd estimator configured to receive the crowd data to estimate a crowd pressure estimation value indicative of a likelihood of a crowd event, the crowd pressure estimation value being based on the crowd data, and an ameliorative action generator to automatically perform at least one function when the crowd pressure estimation value exceeds a predetermined threshold value, wherein the at least one function includes activating one or more feedback outputs configured to provide an ameliorative action.

According to another aspect of the present principles, a method for providing ameliorative action using an unmanned aerial vehicle is provided. The method may include monitoring, by a processor-based monitoring device, a plurality of individuals to determine crowd data associated with the plurality of individuals, estimating a crowd pressure estimation value indicative of a likelihood of a crowd event, the crowd pressure estimation value being based on the crowd data, and automatically performing at least one function when the crowd pressure estimation value exceeds a predetermined threshold value, wherein the at least one function includes activating one or more feedback outputs configured to provide an ameliorative action.

According to another aspect of the present principles, a non-transitory computer readable storage medium for providing ameliorative action using an unmanned aerial vehicle is provided. The non-transitory computer readable storage medium may include a computer readable program for providing ameliorative action using an unmanned aerial vehicle, wherein the computer readable program, when executed on a computer, causes the computer to execute monitoring, by a processor-based monitoring device, a plurality of individuals to determine crowd data associated with the plurality of individuals, estimating a crowd pressure estimation value indicative of a likelihood of a crowd event, the crowd pressure estimation value being based on the crowd data, and automatically performing at least one function when the crowd pressure estimation value exceeds a predetermined threshold value, wherein the at least one function includes activating one or more feedback outputs configured to provide an ameliorative action.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
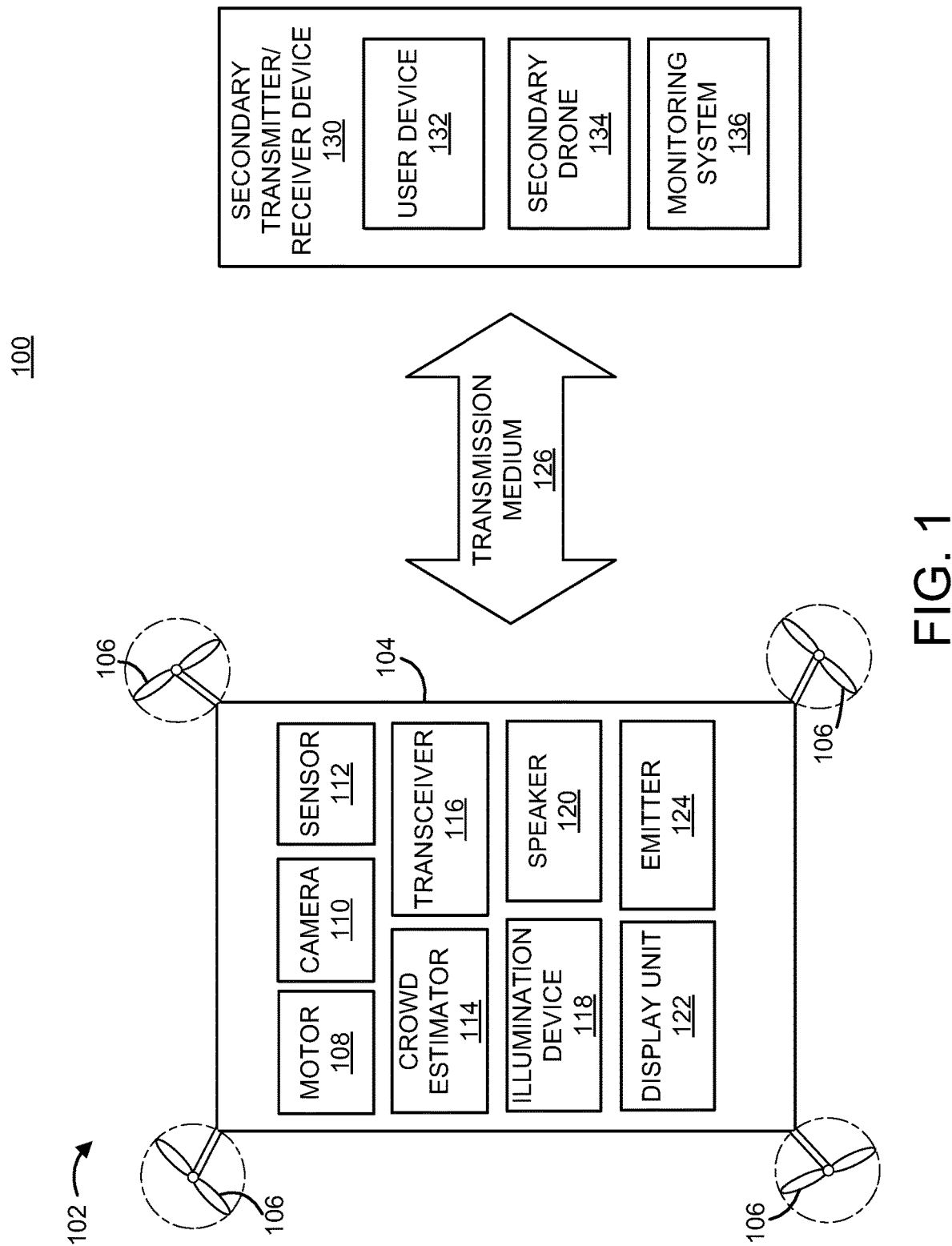
FIG. 1 is a block/flow diagram of an exemplary system for providing ameliorative action using an unmanned aerial vehicle, in accordance with an embodiment of the present principles.

The present principles are directed to unmanned aerial vehicles for providing crowd control. In some embodiments, the present principles provide systems, methods and computer program products to monitor a plurality of individuals and/or estimate crowd pressure estimation values based on crowd data, including crowd density data and flow information (e.g., variance of speeds), to estimate and/or detect a crowd event. Variance of speeds generally refers to a level of disparity in speed values of individuals who are moving through a space. In some embodiments, the system, method and computer program product described herein may detect and/or estimate a likelihood of a crowd event and provide one or more ameliorative actions to control the crowd and/or control the movement of the crowd. In further embodiments, the systems, methods and computer program products provided herein may provide pressure-relief strategies, such as separating the detected individuals in one or more blocks so as to decrease propagation of shockwaves, guiding individuals to less crowded exits, and/or directing individuals away from various obstacles.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for providing ameliorative action prior to and/or during a crowd event using an unmanned aerial vehicle 102 is illustratively depicted. It should be understood by one of ordinary skill in the art that the unmanned aerial vehicle 102 may comprise a drone, a drone-like unit, or a similarly functioning device. In some embodiments, the unmanned aerial vehicle 102 may be employed to control a crowd having a plurality of individuals, such as controlling directional movement of the individuals.

The unmanned aerial vehicle 102 may include a housing unit 104, at least one movement mechanism 106, and a motor 108. The components of the unmanned aerial vehicle 102 may be affixed on the outside of the housing unit 104, or alternatively, may be enclosed within the housing unit 104 of the unmanned aerial vehicle 102.

In some embodiments, the at least one movement mechanism 106 may include a single propeller, a plurality of propellers, a propulsion mechanism, or similarly functioning devices. In one embodiment, the at least one movement mechanism may be powered by at least one motor 108 and a power supply (not shown) to provide movement for the unmanned aerial vehicle. The movement mechanism(s) 106 may be placed at any desired location on the unmanned aerial vehicle 102, such that the placement of the movement mechanism(s) 106 does not interfere with each other or with another component positioned on the unmanned aerial vehicle 102. In one embodiment, the at least one movement mechanism 106 may be positioned on at least one extension arm (not shown), such that the at least one extension arm connects the at least one movement mechanism 106 to the housing unit 104.

Figure 3:
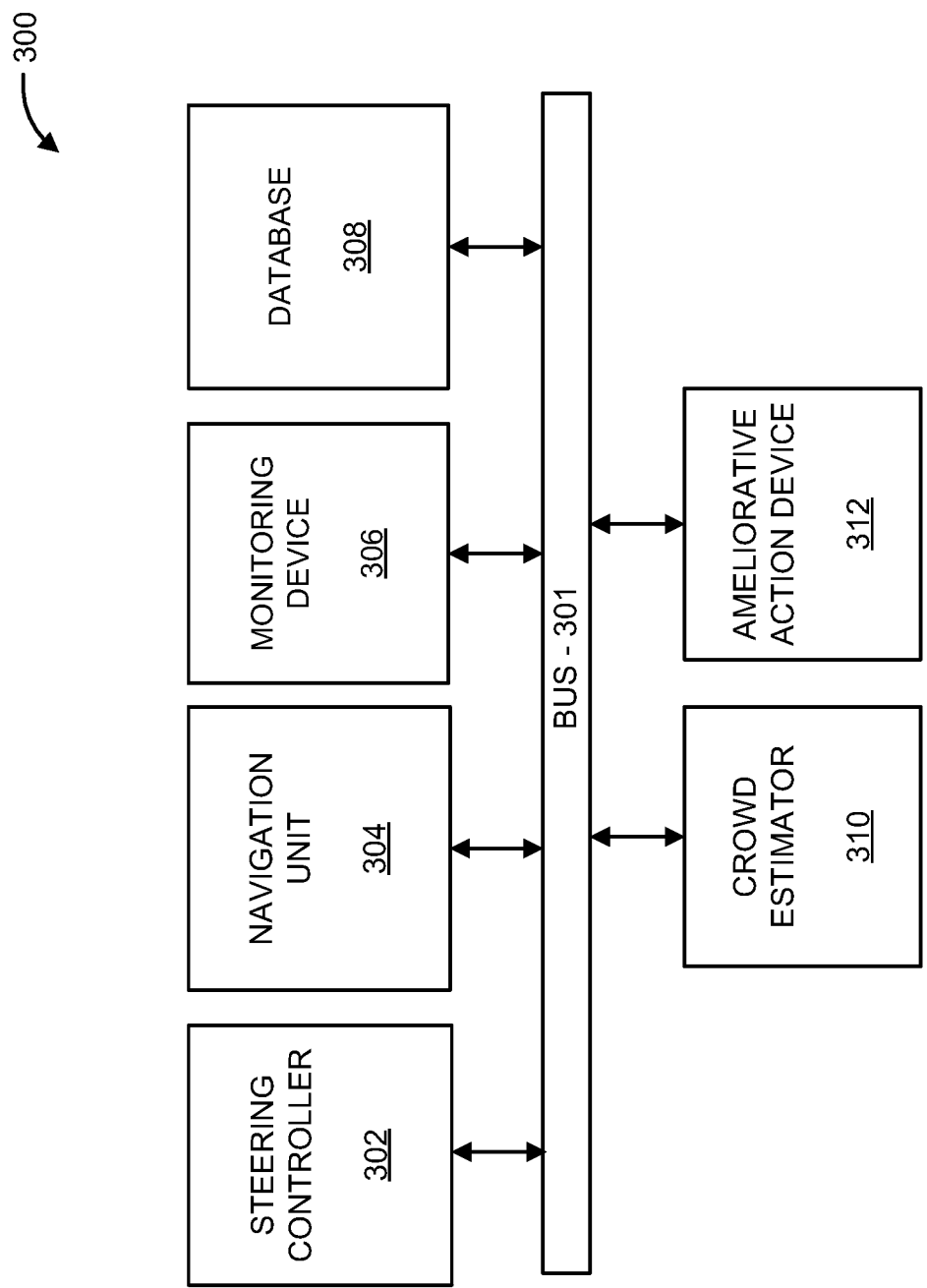
FIG. 3 is a block/flow diagram of an exemplary system for providing ameliorative action using an unmanned aerial vehicle, in accordance with an embodiment of the present principles.

In one embodiment, the movement mechanism 106 and/or motor 108 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 and/or motor 108 may be controlled by a steering controller 302, as illustrated in FIG. 3, to move the unmanned aerial vehicle 102 along three perpendicular axes, namely forward/backward movement, up/down movement, and left/right movement. In addition, the steering controller 302 may control the movement of the unmanned aerial vehicle in a 360 degree rotation, tilting forward/backward movement (e.g., pitching), swiveling left/right movement (e.g., yawing), and pivoting side to side movement (e.g., rolling).

In one embodiment, the movement mechanism(s) 106 and/or motor 108 provides movement for the unmanned aerial vehicle 102 to, for example, detect one or more individuals and/or move the unmanned aerial vehicle 102 toward the one or more individuals to perform one or more functions, including ameliorative actions. For example, the movement mechanisms 106 and/or motor 108 may provide movement for the unmanned aerial vehicle 102 to detect one or more individuals, estimate a likelihood of a crowd event based on the one or more individuals, detect a crowd event, and/or move closer to the crowd event and/or the one or more individuals to provide ameliorative action, as will be described in further detail below. It should be understood that the term "crowd event" may include various situations in which a large number of individuals may be present and/or moving within a particular amount of space. In further embodiments, the movement mechanism(s) 106 and/or motor 108 provides movement for the unmanned aerial vehicle 102 to avoid collision between the unmanned aerial vehicle 102 and an object, such as a person, a doorway, a building, and/or other structures.

The unmanned aerial vehicle 102 may further include at least one camera 110. The camera 110 may be configured to provide visual feedback to the unmanned aerial vehicle 102, including one or more still images and/or video feedback. In some embodiments, the camera 110 may be configured to recognize one or more individuals (e.g., humans), and detect and/or estimate crowd data, which will be described in further detail below. The crowd data may include crowd density data defined as the number of individuals occupying a particular amount of space (e.g., per square meter). For example, the camera 110 may capture still images and/or video feedback including one or more individuals, detect the one or more individuals, and/or monitor movement of the one or more individuals. In further embodiments, the camera 110 may estimate trajectory movement of the one or more individuals, as will be described in further detail below. The camera 110 may capture one or more still images or video images and, using a database, may perform image comparison with database images to detect and/or estimate the crowd density data. In an embodiment, the camera 110 may be configured to detect an individual in need of assistance. For example, the camera 110 may detect an individual who has fallen, using image comparison of stored images showing fallen individuals, and may determine that the individual is in need of assistance.

In yet a further embodiment, the camera 110 may be configured to detect and/or estimate one or more speeds of the one or more individuals. For example, the camera 110 may determine whether or not an individual is standing still (e.g., not traveling, not moving, etc.) and/or whether or not an individual is moving (e.g., traveling). When the individual is moving, the camera 110 may determine a speed at which the individual is traveling (e.g., feet per second, meter per second, etc.). Accordingly, each individual may be associated with a corresponding traveling speed which may be expressed as a correlation function, such as F(detected individual I, detected speed $S_n$) where n is one particular detected speed. In some embodiments, the detected individual may be associated with a plurality of speeds, especially when the individual's speed varies during travel. For example, an individual may be associated with running at 5 miles per hour (mph) at certain points, and/or walking at 1 mph at bottleneck points. Accordingly, the camera 110 may detect a variance of speeds of the one or more detected individuals. The variance of speeds may be indicative of flow information of the detected individuals, including flow rate information, flow direction and/or other flow characteristics (e.g., steady versus unsteady flow, laminar versus turbulent flow, etc.). For example, the flow information may include information on various flow characteristics, such as average value of the speed in which the detected individuals are moving in different regions of space. The flow information may also include information related to directions of movement and the variation of different kinds of movements with a region of space.

In an embodiment, the variance of speeds may generally refer to a variety of speeds of individuals who are moving (e.g., walking, running, etc.) within a space. Using probability theory and statistics methods, variance of speeds may measure how far a set of numbers are spread out, wherein a variance of zero indicates that all the values are identical. In an embodiment, a variance of zero may indicate that all detected individuals are moving at the same speed whereas a high variance may indicate that individuals are moving at significantly different speeds.

A plurality of individuals who move relatively at the same speed generally are able to move to a particular destination (e.g., exit) faster than individuals moving a varying speeds. In addition, individuals moving at the same speed generally do not cause crowd events and/or do not contribute to shockwaves during crowd events. In an embodiment, the variance of speeds may be used to determine the flow information of a plurality of individuals, such as how efficiently the individuals are moving within a given space. For example, low variance of speeds and/or high flow rates may indicate that individuals are efficiently moving to a particular destination. In contrast, high variance of speeds and high values of crowd pressure may indicate that individuals are inefficiently moving to a particular destination or moving in a dangerous manner, with an increased likelihood of a current and/or impending crowd event. For example, if within a region of space, some individuals are moving very fast and some are moving very slow (or not moving at all), this may be indicative of a high variance of speeds.

In a further embodiment, the camera 110 may be configured to provide visual feedback of obstacles in the path of the unmanned aerial vehicle 102 for any purpose, such as, but not limited to, navigation guidance to the unmanned aerial vehicle 102. It should be understood that various types of cameras are contemplated, including night-vision enabled cameras, infrared sensing cameras, X-ray imaging devices, line scan imaging devices, etc.

In some embodiments, the camera 110 may be placed on the unmanned aerial vehicle 102 such that the camera may provide visual feedback in 360 degrees on a horizontal plane and/or 360 degrees on a vertical plane of the unmanned aerial vehicle 102. In some embodiments, the camera 110 may include a plurality of cameras to provide visual feedback in all directions surrounding the unmanned aerial vehicle 102 such that there are no obscurations of the visual field (e.g., blind spots). In further embodiments, the camera 110 may be embedded within the housing unit 104 so as to prevent any negative effects to the aerodynamics of the unmanned aerial vehicle 102.

In an embodiment, the unmanned aerial vehicle 102 may include at least one sensor 112. The sensor 112 may include, but is not limited to, an acoustic sensor (e.g., microphone), a chemical sensor, an infrared sensor, an optical sensor, a collision avoidance sensor (e.g., a proximity sensor), a heat sensor, a vibration sensor, etc. In an embodiment, the sensor 112 may be configured to detect one or more individuals (e.g., humans), detect and/or estimate crowd data and/or detect and/or estimate a likelihood of a crowd event. For example, the sensor 112 may be configured to detect sounds made by one or more individuals. In some embodiments, the loudness of the detected sounds may be indicative of an approximate amount of individuals present (e.g., crowd density) and/or a crowd event. For example, as the loudness of the detected sounds increases, the approximated amount of detected individuals increases indicating large crowd density. The sounds may include speech produced by the individuals themselves, or may include non-speech sounds, such as noises generated from running, stomping, opening/closing of doors, screaming, yelling, audible alarms, rate of breathing, etc.

In some embodiments, the sensor 112 may detect and/or monitor one or more individuals by heat sensing to determine crowd data. For example, the sensor 112 may detect the one or more individuals using thermal detection methods. In some embodiments, the amount of thermal detection per square meter may be indicative of the amount of individuals detected (e.g., crowd density). In a further embodiment, the sensor 112 may be configured to detect and/or monitor one or more individuals by detecting vibrational movement caused by the one or more individuals. For example, the sensor 112 may detect an amount of vibrations present, such as floor vibrations, which may be indicative of the amount of individuals present (e.g., crowd density). In yet a further embodiment, the sensor 112 may determine the crowd density data by detecting an amount of a particular gaseous material present in a particular area. For example, the sensor 112 may detect oxygen content and/or carbon dioxide ($CO_2$) emissions. The amount of gaseous material present in a particular area may be indicative of the approximated amount of individuals in a given area. Accordingly, the sensor 112 may detect and/or monitor the crowd density to estimate and/or detect a crowd event.

In yet a further embodiment, the sensor 112 may be configured to detect and/or estimate one or more speeds of the one or more individuals. For example, the sensor 112 may determine whether or not an individual is standing still (e.g., not traveling), and/or whether or not an individual is moving (e.g., traveling). For example, the sensor 112 may include one or more motion sensors and/or traffic counters placed within a hallway, corridor, and/or doorway configured to detect the number of individuals traversing the sensor 112 and/or the speed in which the individual is traveling. When the individual is moving, the sensor 112 may determine a speed at which the individual is traveling. For example, the sensor 112 may detect the speed of the individual by calculating the amount of time it takes the individual to travel between two traffic sensors. Accordingly, each individual may be associated with a corresponding traveling speed which may be expressed as a correlation function, such as F(detected individual I, detected speed $S_n$) where n is one particular detected speed. In some embodiments, the detected individual may be associated with a plurality of speeds, especially when the individual's speed varies during travel. For example, an individual may be associated with running at 5 miles per hour (mph) at certain points, and/or walking at 1 mph at bottleneck points. Accordingly, the sensor 112 may detect a variance of speeds among the detected individuals.

In a further embodiment, the sensor 112 may be configured to detect proximity to objects and/or obstacles in the path of the unmanned aerial vehicle 102 for any purpose such as, but not limited to, navigation guidance to the unmanned aerial vehicle 102. The sensor 112 may be configured to determine a distance between the unmanned aerial vehicle 102 and the detected object.

The unmanned aerial vehicle 102 may include a crowd estimator 114, which may include one or more processors. The crowd estimator 114 may determine a crowd pressure estimation value indicative of a likelihood of a crowd event. For example, the crowd estimator 114 may determine a crowd pressure estimation value based on the crowd density data multiplied by the flow information (e.g., variance of speeds). The crowd estimator 114 may receive, as input, the crowd density information and/or variance of speed information from the camera 110, sensor 112 and/or transceiver 116. In some embodiments, the crowd estimator 114 may detect a crowd event, and/or a likelihood of a crowd event when the crowd pressure estimation value exceeds a predetermined threshold value. For example, the predetermined threshold for the crowd pressure estimation value may include a crowd density of six (6) persons per square meter and/or high variance speeds (e.g., individuals moving at significantly different speeds). In some embodiments, variance speeds of two (2) persons per second may be able to escape from a crowd stampede.

In an embodiment, the unmanned aerial vehicle 102 may include a transceiver 116 or similarly functioning device(s). The transceiver 116 may be configured to communicate via transmission medium 126 with one or more secondary transmitter/receiver devices 130, such as a user device 132 (e.g., a mobile device, tablet, computing device, etc.), one or more unmanned aerial vehicles 134 (e.g., secondary drones), and/or a monitoring system 136. For example, the monitoring system 136 may include a computing device used by security personnel and/or emergency services.

The transceiver 116, which may include a wireless module, may communicate with the wireless modules of other devices, allowing for the formation of a mesh network. The wireless module may include a low-power wireless transmitter, for example using a wireless protocol such as WirelessHART®, ZigBee®, Bluetooth®, 6LoWPAN, or Wi-Fi®, that connects to the wireless modules of additional devices. A mesh network is a multi-hop network wherein each unmanned aerial vehicle 102 and/or secondary devices 130 can be both a source and a relay communication node.

In some embodiments, the transceiver 116 may communicate with each of the secondary devices 130 to relay crowd event information, individual information, and/or instructions to perform one or more ameliorative actions. For example, the transceiver 116 of unmanned aerial vehicle 102 may communicate the amount of individuals detected (e.g., crowd density) to a secondary drone 134 and an instruction to perform an ameliorative action such that the secondary drone 134 provides ameliorative action. In a further embodiment, the transceiver 116 may be configured to gather/receive various information from a user device 132 and communicate such information to one or more secondary devices 130 to provide ameliorative action. For example, the transceiver 116 may be configured to communicate with a user device 132, such as a protective belt, heart rate monitoring device, and/or cellular telephone worn and/or carried by the user, to determine information specific to the user, such as heat rate, breathing rate, etc. The transceiver 116 may receive such information and relay that information to one or more components of the unmanned aerial vehicle 102 and/or secondary devices 130. For example, the user information may be communicated to a secondary drone 134 such that the secondary drone 134 provides assistance to the particular individual.

In some embodiments, the transceiver 116 may receive crowd density and/or flow information from one or more user devices 132. For example, the transceiver 116 may receive information gathered by each user device 132 (e.g., cellular telephone) wirelessly in a particular area, each user 132 device sharing location information of the user device 132 and/or speed in which the user device 132 is traveling. The transceiver 116 may receive various information relating to individuals located in a particular area, such as the number of individuals present in the particular location and variance of speeds in which each individual is moving. Accordingly, the transceiver 116 may receive crowd density and flow information relating to a plurality of individuals from each user device 132, which may be employed by the crowd estimator to determine the crowd pressure estimation value. In some embodiments, the transceiver 116 may continuously and/or periodically receive location updates and/or speeds in which the user device 132 is traveling such that crowd pressure estimation value(s) remain up-to-date.

In some embodiments, the transceiver 116 may receive information wirelessly from a monitoring system 136, such as a crowd density monitoring system. The crowd density monitoring system may be configured to detect and/or provide crowd density information to the unmanned aerial vehicle 102 using a wireless protocol such as WirelessHART®, ZigBee®, Bluetooth®, 6LoWPAN, or Wi-Fi®. For example, a crowd density monitoring system may observe the flow information and/or direction of the moving individuals to evaluate the crowd density, including the number of persons per unit area (e.g., square meter). Crowd monitoring systems may include, for example, video cameras directed towards a crowd, aisles in a stadium, etc. In addition, information from mobile devices (e.g., cellular telephones) collected at regular intervals that provide and/or share location information of individuals may be used as a crowd density monitoring system to evaluate crowd density. For example, cellular telephones may provide location information for each user (e.g., individual) which may be compiled with other location information of other users to determine crowd density and/or flow information in a particular area. Determining location information for each mobile device may, in some embodiments, be accomplished using various methods including, for example, in-network localization (e.g., connection to cell tower, network bandwidth usage, call data records, etc.) and/or on-device localization (e.g., GPS positioning, WiFi® fingerprinting, etc.).

In some embodiments, the transceiver 116 may receive and/or transmit information to/from a safety pre-warning apparatus (not shown) and/or a corridor stampede preventing warning device (not shown) to enable a warning signal to the individuals in a particular area and/or corridor (e.g., hallways), such as an early warning sign, a message sent to a mobile device, a projected warning on a public display (e.g., display screen), a warning communicated through a light display (e.g., flashing lights), an audible warning (e.g., beep, spoken directions), etc. In some embodiments, the safety pre-warning apparatus and/or corridor stampede preventing warning device may include an integrated intercommunication device, such as an intercom system. For example, the intercom system may include loudspeakers and/or automatically closing emergency doors (e.g., fire doors), which may be integrated within walls of buildings and/or corridors. In an embodiment, the transceiver 116 may be configured to perform at least one function (e.g., an ameliorative action), such as generating an audible instruction via the safety pre-warning apparatus and/or corridor stampede preventing warning device to the plurality of individuals. In a further embodiment, the transceiver 116 may be configured to activate the closing emergency doors.

The unmanned aerial vehicle 102 may perform one or more ameliorative actions based on the crowd pressure estimation value, such as when the crowd pressure estimation value exceeds a predetermined threshold value. Ameliorative actions may include, but are not limited to, directing and/or redirecting the detected individuals towards appropriate exits (e.g., exits that lead to safety), alerting the detected individuals to avoid certain areas, slowing the speed of the detected individuals within the crowd so as to decrease the probability of a crowd event, and/or triggering pressure-relief strategies, including separation of detected individuals into blocks so as to decrease and/or eliminate the propagation of shockwaves. The present principles provide at least one of the following advantages: namely, multiples streams of communication between the unmanned aerial vehicle 102 and the detected individuals, communicative directions and/or commands that do not require the direct attention of the individuals to notice and/or interpret, and ameliorative actions based on analysis of the characteristics of the crowd pressure estimation value and/or situation.

In one embodiment, the unmanned aerial vehicle 102 includes an illumination device 118. The illumination device 118 may include one or more lights positioned on the unmanned aerial vehicle 102, which may produce various colors and/or patterns (e.g., static non-moving lights, dynamic moving lights, blinking lights, etc.). In some embodiments, the illumination device 118 may illuminate one or more lights in a particular color (e.g., green), and/or a directional light (e.g., green arrow), to signal to the individuals that a passageway (e.g., hallway, staircase, etc.) is available. The illumination device 118 may illuminate another distinctive color (e.g., red), and/or a directional light (e.g., red "X"), indicating that a passageway is unavailable. The passageway could be unavailable for multiple reasons and/or situations, such as the presence of another crowd event and/or increased crowd pressure, hazardous obstacles (e.g., fire, debris, etc.), and/or passageways with no exits (e.g., dead-ends).

In some embodiments, the illumination device 118 may illuminate a distinctive color when a person in need is detected by the unmanned aerial vehicle 102. For example, when the unmanned aerial vehicle 102 detects an individual who has fallen, the unmanned aerial vehicle 102 may hover over the fallen individual and the illumination device 118 may emit a red flashing light signaling to other individuals that a fallen person is present and/or located beneath the unmanned aerial vehicle 102. Accordingly, the illumination device 118 physically indicates a particular location which oncoming individuals should avoid, thereby redirecting oncoming individuals and allowing the fallen individual the opportunity to stand up.

The unmanned aerial vehicle 102 may include a speaker 120 which may be configured to provide an ameliorative action. The speaker 120 may include a loudspeaker, a transducer, and/or similarly functioning devices. In some embodiments, the speaker 120 may provide synthesized speech to the one or more detected individuals. For example, the speaker 120 may provide instructions and/or announcements to the one or more detected individuals, such spoken directions and/or announcements that passageways that are "open" (e.g., available) and/or "closed" (e.g., unavailable). In some embodiments, the speaker 120 may provide an acoustic sound, drumbeat and/or tone to regulate each individual's pace and/or frequency of movement. The beat may indicate the proper pace that each individual should move in order to safely escape from the crowd stampede and/or crisis. When each individual moves at the same frequency, intermittent movement and/or turbulent movement is prevented, thereby reducing the amount of individuals per square meter and preventing crowd events.

In some embodiments, the speaker 120 may announce certain blocks of individuals to calmly leave a particular area. For example, the speaker 120 may announce particular seat numbers in a stadium setting directing those particular individuals to proceed to emergency exits. Accordingly, the speaker 120 may selectively sub-divide the detected individuals such that a certain number of individuals leave the vicinity at any one particular time, further reducing and/or preventing a crowd stampede.

The unmanned aerial vehicle 102 may include a display unit 122. The display unit 122 may include a screen, projector, and/or similarly functioning devices, configured to provide visual information to the one or more individuals. For example, the display unit 122 may display directional instructions (e.g., arrows) and/or commands (e.g., "stop", "do not enter", "dead-end", etc.) indicating available and/or unavailable passageways and/or exits. The display unit 122 may further indicate if obstacles (e.g., fire, debris, fallen individuals, etc.) are present in a current passageway and/or exit. In other embodiments, the display unit 122 may be configured to generate and/or display a map of alternative passageways and/or exits. In yet a further embodiment, the display unit 122 may be configured to display crowd pressure information (e.g., the crowd pressure estimation value), including crowd density information and/or flow information. For example, the display unit 122 may display whether or not a particular passageway and/or exit is currently exhibiting increased crowd pressure such that an individual may avoid that particular passageway and/or exit.

In some embodiments, the unmanned aerial vehicle 102 may include at least one emitter 124. The emitter 124 may include, for example, a light beam emitter (e.g., infrared light, laser light, etc.) and/or a spray nozzle. In an embodiment, the emitter 124 may emit infrared beams and/or heat beams to redirect the detected individuals to and/or from a particular area. For example, the emitter 124 may emit an infrared beam and/or heat beam in a passageway and/or doorway to deter individuals from entering a particular area, such as an area experiencing a fire. In another embodiment, the emitter 124 may emit a scent to deter and/or redirect individuals. For example, the emitter 124 may dispense an aversive scent, such as N-butyl mercaptan, butanethiol, and/or any other foul-smelling odor, to deter individuals from particular areas. The emitter 124 may emit and/or dispense such aversive scents in passageways and/or doorways to deter individuals from entering such locations, especially locations which do not lead to safety and/or locations experiencing maximum capacities (e.g., crowd pressure).

It is to be appreciated that system 200 described below with respect to FIG. 2, and system 300 described below with respect to FIG. 3, are systems for implementing respective embodiments of the present principles. Part or all of processing system 100 may be implemented in one or more of the elements of system 200 of FIG. 2 and/or system 300 of FIG. 3. Further, it is to be appreciated that processing system 100, 200 and/or 300 may perform at least part of the method described herein, including, for example, at least part of method 400 of FIG. 4.

Figure 2:
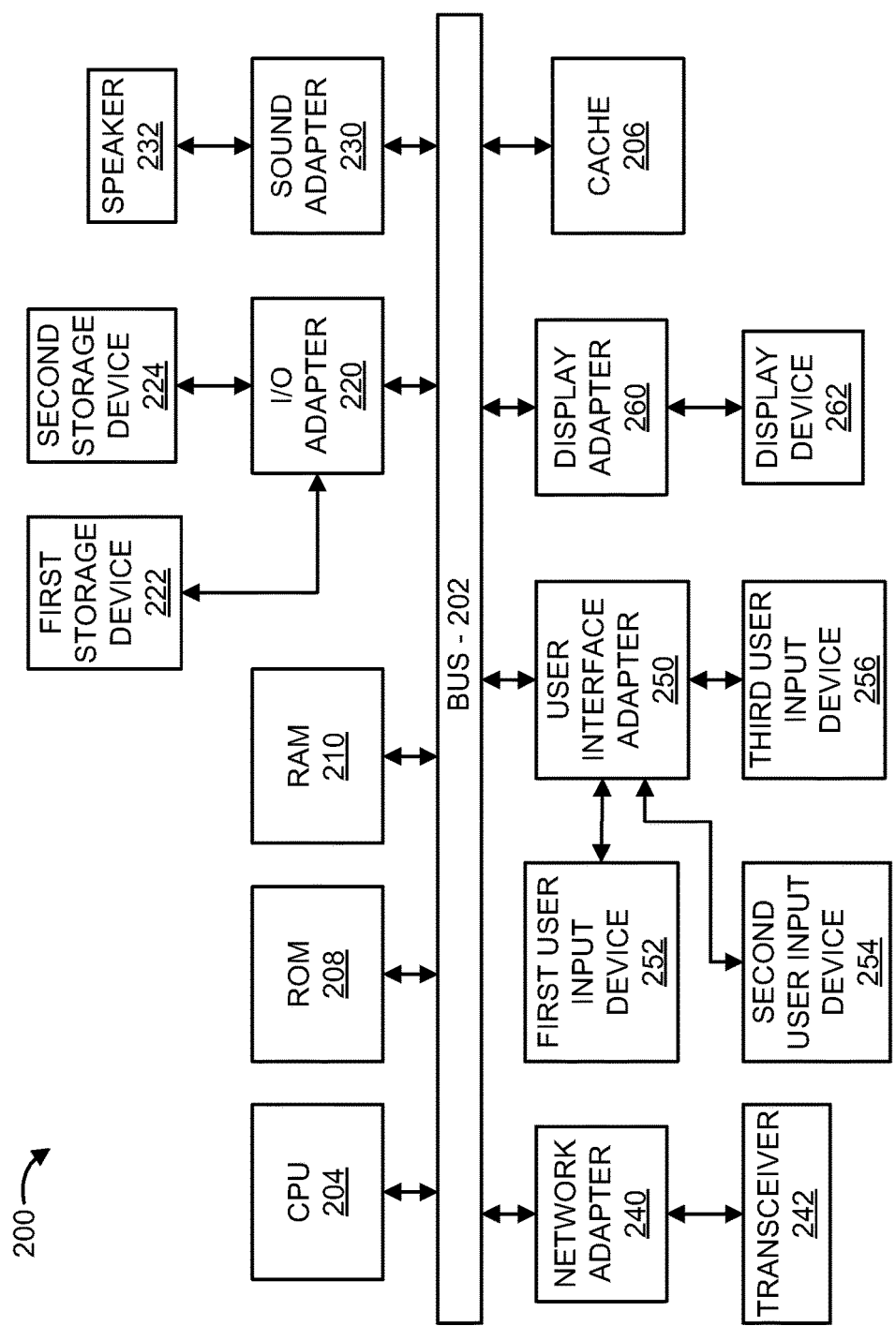
FIG. 2 is a block/flow diagram of an exemplary processing system for providing ameliorative action using an unmanned aerial vehicle, in accordance with an embodiment of the present principles.

Now referring to FIG. 2, with continued reference to FIG. 1, an exemplary processing system 200 to which the present principles may be applied, in accordance with an embodiment, is illustratively depicted. The processing system 200 includes at least one processor, such as a computer processing unit (CPU) 204, operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260 are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, etc. The storage devices 222 and 224 can be the same type of storage device or different types of storage devices. In one embodiment, database images of detected images may be stored on the first storage device 222 and/or the second storage device 224 for comparison with images obtained by the camera 110 of FIG. 1.

A speaker 232 is operatively coupled to system bus 202 by the sound adapter 230. In one embodiment, the unmanned aerial vehicle 102 may be configured to generate a command, instruction, or audio signal, such as a beep and/or beat, from the speaker 232.

A transceiver 242 is operatively coupled to system bus 202 by network adapter 240. A display device 262 is operatively coupled to system bus 202 by display adapter 260. In an embodiment, the display device 262 may be configured to display instructions and/or commands to the detected individuals. In some embodiments, the display device 262 may display, to an individual, a virtual map illustrating available and/or unavailable passageways and/or exits.

A first user input device 252, a second user input device 254, and a third user input device 256 are operatively coupled to system bus 202 by user interface adapter 250. The user input devices 252, 254, and 256 can be any type of input device, including but not limited to, a keyboard, a mouse, a keypad, an image capture device, a motion sensing device, a microphone, a device incorporating the functionality of at least two of the preceding devices, and so forth. Other types of input devices can also be used while maintaining the spirit of the present principles. The user input devices 252, 254, and 256 can be the same type of user input device or different types of user input devices. The user input devices 252, 254, and 256 are used to input and output information to and from system 200.

The processing system 200 may also include other elements (not shown) or may omit some elements as shown. For example, various other input devices and/or output devices can be included in processing system 200 depending upon the particular implementation of the same, such as various types of wireless and/or wired input and/or output devices. Moreover, additional processors, controllers, memories and so forth, in various configurations, can also be utilized. These and other variations of the processing system 200 are readily contemplated.

Referring now to FIG. 3, with continued reference to FIG. 1, an exemplary system 300 for providing ameliorative action in the event of and/or during a crowd event using an unmanned aerial vehicle 102 is illustratively depicted, in accordance with an embodiment of the present principles. The system 300 includes a steering controller 302, a navigation unit 304, a monitoring device 306, a database 308, a crowd estimator 310, and/or an ameliorative action device 312.

The steering controller 302 may be configured to control movement of the unmanned aerial vehicle 102. In one embodiment, the steering controller 302 may include a motor, such as motor 108 in FIG. 1. In some embodiments, the steering controller 302 may control the aerial movement of the unmanned aerial vehicle 102 by controlling the at least one movement mechanism 106 and/or motor 108 illustrated in FIG. 1.

In an embodiment, the steering controller 302 may be configured to control movement of the unmanned aerial vehicle 102 by controlling the rotational speed(s) and/or rotational direction(s) of each of the movement mechanisms 106 independently. For example, the steering controller 302 may be configured to rotate each of the movement mechanisms 106 in a single direction, or alternatively, the steering controller 302 may be configured to rotate each of the movement mechanisms 106 in opposing directions. In one embodiment, the steering controller 302 may be configured to control movement of the unmanned aerial vehicle 102 to move the unmanned aerial vehicle 102 to particular locations, such as towards a crowd event, and/or around/over difficult terrain and/or obstacles (e.g., walls, doorways, etc.).

In another embodiment, the steering controller 302 may control the aerial movement of the unmanned aerial vehicle 102 based on detected individuals and/or crowd events. For example, the steering controller 302 may provide aerial movement to the unmanned aerial vehicle 102 to detect one or more individuals and/or perform one or more ameliorative actions.

In a further embodiment, the system 300 may include a navigation unit 304, such as a global positioning system (GPS). The navigation unit 304 may provide location information to the steering controller 302. For example, the navigation unit 304 may include map coordinates of a particular area, such as a floor plan of a multistory building, and may provide such information to the steering controller 302, such that the steering controller 302 may direct the unmanned aerial vehicle 102 to a particular location.

In an embodiment, the system 300 may include a monitoring device 306. The monitoring device 306 may include a camera, a sensor, a radar system or similarly functioning devices to detect one or more individuals and/or estimate crowd data. The crowd data may include crowd density data representative of an amount of individuals occupying a particular amount and/or unit of space (e.g., per square meter). For example, the monitoring device 306 may capture still images and/or video feedback (collectively referred herein as "captured feedback") including one or more individuals, and compare the captured feedback with stored images and/or video (collectively referred herein as "stored feedback") stored in database 308. By comparing the captured feedback with stored feedback, the monitoring device 306 may be configured to determine an approximate and/or estimated amount of individuals in a particular location (e.g., crowd data).

In a further embodiment, the monitoring device 306 may be configured to estimate trajectory movement of the one or more individuals, including speeds and/or direction of each individual. In some embodiments, the monitoring device 306 may be configured to determine collisions between one or more individuals based on speed and/or movement of each individual. For example, the monitoring device 306 may detect one or more individuals and generate a graphical representation of the one or more individuals to determine a distance to collision between the individual and another object (e.g., a second individual). The unmanned aerial vehicle 102 (either by itself or through communications to cloud computers among a plurality of unmanned aerial vehicle 102), can determine, analyze and process position information of each individual, calculate crowd data (e.g., crowd density and flow information), and display the crowd data (e.g., crowd pressure estimation value) in a graphical mode to a screen, such as a display screen in a sporting event. The unmanned aerial vehicle 102 may utilize this information to guide and/or control individuals through exits and/or provide such information (e.g., flow rates, flow directions, locations of people, crowd pressure maps, etc.) to emergency personnel and/or other drones. Accordingly, the monitoring device 306 may be configured to determine flow information of the one or more individuals.

In a further embodiment, the monitoring device 306 may be configured to determine the cognitive states and/or emotions of the one or more individuals to forecast a crowd event and/or estimate the crowd data. For example, the monitoring device 306 may detect the cognitive states of the one or more individuals which may be indicative of the emotions of the individuals. Emotions may be defined as evolving quantities arising from a reaction to contextual situations in a set of dynamic pattern of events. In an embodiment, the monitoring device 306 may determine the emotions of the one or more individuals by the social and collective behaviors of the individuals to determine a likelihood of a crowd event. For example, the monitoring device 306 may capture one or more cognitive states of each individual using, for example, a camera, and the monitoring device 306 may determine a likelihood of a crowd event using a probabilistic signal processing modeling technique and/or classification model. The probabilistic signal processing technique may include analysis of different types of collective behaviors based on interactions among individuals, and the classification model may determine whether emotions are positive or negative. For example, an increased amount of emotions that are negative may indicative of a likelihood of a crowd event.

In yet a further embodiment, the monitoring device 306 may be configured to detect and/or analyze crowd features. For example, the monitoring device 306 may detect a level of crowd noise, such as crowd noise and/or crowd movement in a stadium. The crowd features may be provided to the crowd estimator 310 and/or ameliorative action generator 312 to determine, for example, an appropriate ameliorative action based on the crowd features. Crowd features may include variance of speeds of people, crowd pressure, crowd density, crowd emotions, etc. For example, as the crowd pressure increases, amelioration actions can be changed and/or adjusted. In some embodiments, warning signs may be projected on walls at low crowd pressure estimation values. At higher crowd pressures, an audio announcement may be made, with blinking lights along certain corridors. At highest crowd pressures, physical barriers may be provided at advantageous positions to reduce the likelihood of a crowd event. Similarly, the emotions of elation, anger, nervousness, and the like may be considered, along with flow information parameters, to trigger different ameliorative actions. For example, a crowd exhibiting angry emotions may be more likely to lead to a crowd event than a crowd exhibiting happy emotions. For a crowd exhibiting fear and at high crowd pressure estimation values, the most extreme ameliorations actions may be provided, including changing lighting, calling of emergency personnel, the physical removal of a wall, etc.

The system 300 may further include a crowd estimator 310. The crowd estimator 310, which may include one or more processors, may be configured to determine and/or estimate a crowd event by estimating a crowd pressure estimation value indicative of a likelihood of a crowd event. In an embodiment, the crowd estimator 310 may estimate a crowd pressure estimation value based on the crowd density information multiplied by the flow information (e.g., variance of speeds). The crowd estimator 310 may estimate a crowd event and/or likelihood of a crowd event when a value of the crowd pressure estimation value exceeds a predetermined threshold. In some embodiments, crowd movement may be modeled as physical particles (e.g., individuals), where the monitoring device 306 monitors and/or anticipates particle trajectory and movement of the physical particles to assess and/or estimate possible collisions between the physical particles. Examples of variance speed levels include rapid acceleration and/or rapid deceleration, which may be monitored by monitoring device 306. The threshold levels of variance of speeds may vary based on the physical location and/or size of the crowd (e.g., number of individuals present in the physical location), physical obstacles, as well as crowd characteristics (e.g., elderly, injured, etc.). For example, in the standard size room the escape speed may be 2.5 persons per second with an obstacle 0.8 meters in radius.

The ameliorative action device 312 may be configured to determine and/or perform one or more functions, including one or more ameliorative actions, when the crowd pressure estimation value exceeds a predetermined threshold value. In some embodiments, the ameliorative action device 312 may include one or more features of FIG. 1, such as the transceiver 116, the illumination device 118, the speaker 120, the display unit 122, the emitter 124, and/or any similar functioning devices to direct and/or control the movements of one or more individuals to safety and/or provide pressure-relief prior to and/or during a crowd event. Ameliorative actions may include, but are not limited to, actions associated with crowd control, controlling movement of the individuals, directing and/or redirecting the detected individuals towards appropriate exits (e.g., exits that lead to safety), alerting the detected individuals to avoid certain areas, slowing the speed of the detected individuals within the crowd so as to decrease the probability of a crowd event, and/or triggering pressure-relief strategies, including separation of detected individuals into blocks so as to decrease and/or eliminate the propagation of shockwaves.

In an embodiment, the ameliorative action device 310 may be configured to determine a most effective ameliorative action based on the detected emotions and/or crowd features. For example, the ameliorative action device 310 may determine that visual ameliorative actions are more effective when an extremely loud crowd is detected.

In the embodiment shown in FIG. 3, the elements thereof may be interconnected by a bus 301. However, in other embodiments, other types of connections can also be used. Moreover, in an embodiment, at least one of the elements of system 300 is processor-based. Further, while one or more elements may be shown as separate elements, in other embodiments these elements can be combined as one element. These and other variations of the elements of system 300 are readily determined by one of ordinary skill in the art, given the teachings of the present principles provided herein.

Figure 4:
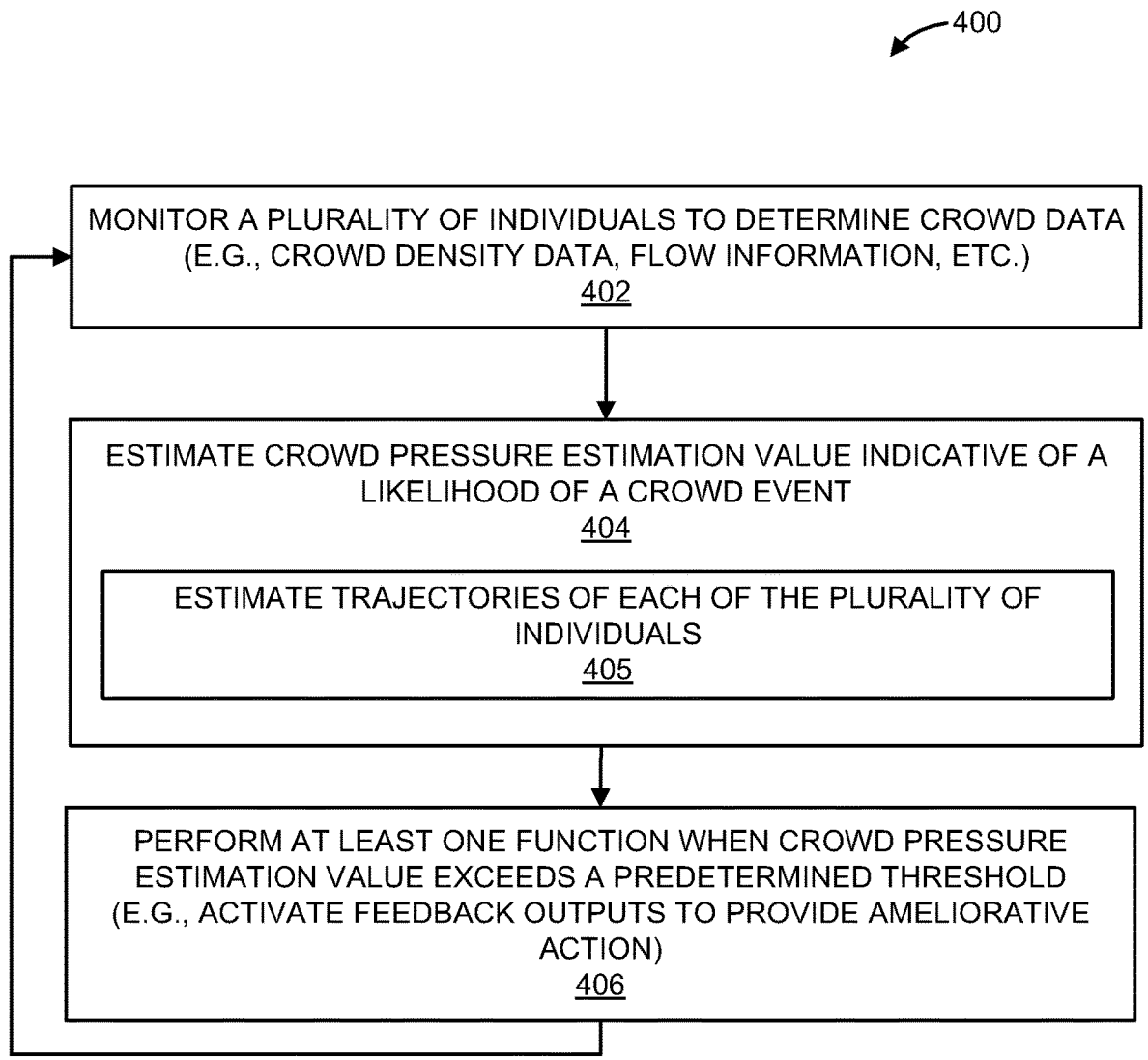
FIG. 4 is a block/flow diagram of an exemplary method for providing ameliorative action using an unmanned aerial vehicle, in accordance with an embodiment of the present principles.

Now referring to FIG. 4, with continued reference to FIGS. 1-3, FIG. 4 shows an exemplary method 400 for providing ameliorative action using an unmanned aerial vehicle 102, in accordance with an embodiment of the present principles.

In block 402, the method 400 may include monitoring, by a processor-based monitoring device, such as monitoring device 306 of FIG. 3, a plurality of individuals to determine crowd data associated with the plurality of individuals (e.g., crowd density data, flow information, etc.). In some embodiments, monitoring may include detecting one or more variables from a location associated with the plurality of individuals. For example, the one or more variables may include one or more of the following: namely, video feedback of the plurality of individuals, audio feedback of the plurality of individuals, floor vibration feedback caused by the plurality of individuals, and oxygen content feedback in a location of the plurality of individuals. In some embodiments, monitoring may include detecting emotions of each of the plurality of individuals. In a further embodiment, monitoring may include detecting one or more individuals in need of assistance, such as an individual who has fallen and/or is unable to return to a standing position.

In block 404, the method 400 may include receiving crowd data to estimate a crowd pressure estimation value indicative of a likelihood of a crowd event. The crowd pressure estimation value may be a based on the crowd data, such as the crowd density data and the flow information. In some embodiments, a high likelihood of a crowd event may exist when crowd pressure (e.g., crowd pressure estimation value) associated with the plurality of individuals exceeds a predetermined threshold value. The predetermined threshold value may include a threshold level of individuals confined to a particular location (e.g., persons per square meter) traveling in high variance of speeds. In some embodiments, the predetermined threshold may include at least six individuals per square meter. In a further embodiment, estimating the crowd pressure estimation value may include estimating trajectories of each of the plurality of individuals, as illustrated in block 405.

In block 406, the method 400 may include automatically performing at least one function when the crowd pressure estimation value exceeds a predetermined threshold value, such functions being performed before an impending crowd event and/or during a current crowd event. The at least one function may include activating one or more feedback outputs, the feedback outputs configured to provide ameliorative action. Ameliorative actions may include, but are not limited to, directing and/or redirecting the detected individuals towards appropriate exits (e.g., exits that lead to safety), alerting the detected individuals to avoid certain areas, slowing the speed of the detected individuals within the crowd so as to decrease the probability of a crowd event, and/or triggering pressure-relief strategies, including separation of detected individuals into blocks so as to decrease and/or eliminate the propagation of shockwaves.

In some embodiments, performing the at least one function may include providing an instruction to the plurality of individuals, the instruction being video feedback and/or audio feedback. In an embodiment, providing an instruction may include generating a virtual map indicating a directional route to safety. The virtual map may be displayed on a display unit, such as display unit 122 mounted on the unmanned aerial vehicle 102 of FIG. 1. In another embodiment, providing an instruction may include illuminating one or more lights mounted on the unmanned aerial vehicle 102. In an embodiment, the at least one function may include emitting infrared beams, heat beams, and/or aversive scents to redirect the plurality of individuals from a particular area. The at least one function may, in some embodiments, be automatically performed for one or more individuals in need of assistance. It should be understood that the blocks of 404-406 may be continuously repeated or may discontinue when a crowd event is no longer detected and/or estimated.

Figure 5:
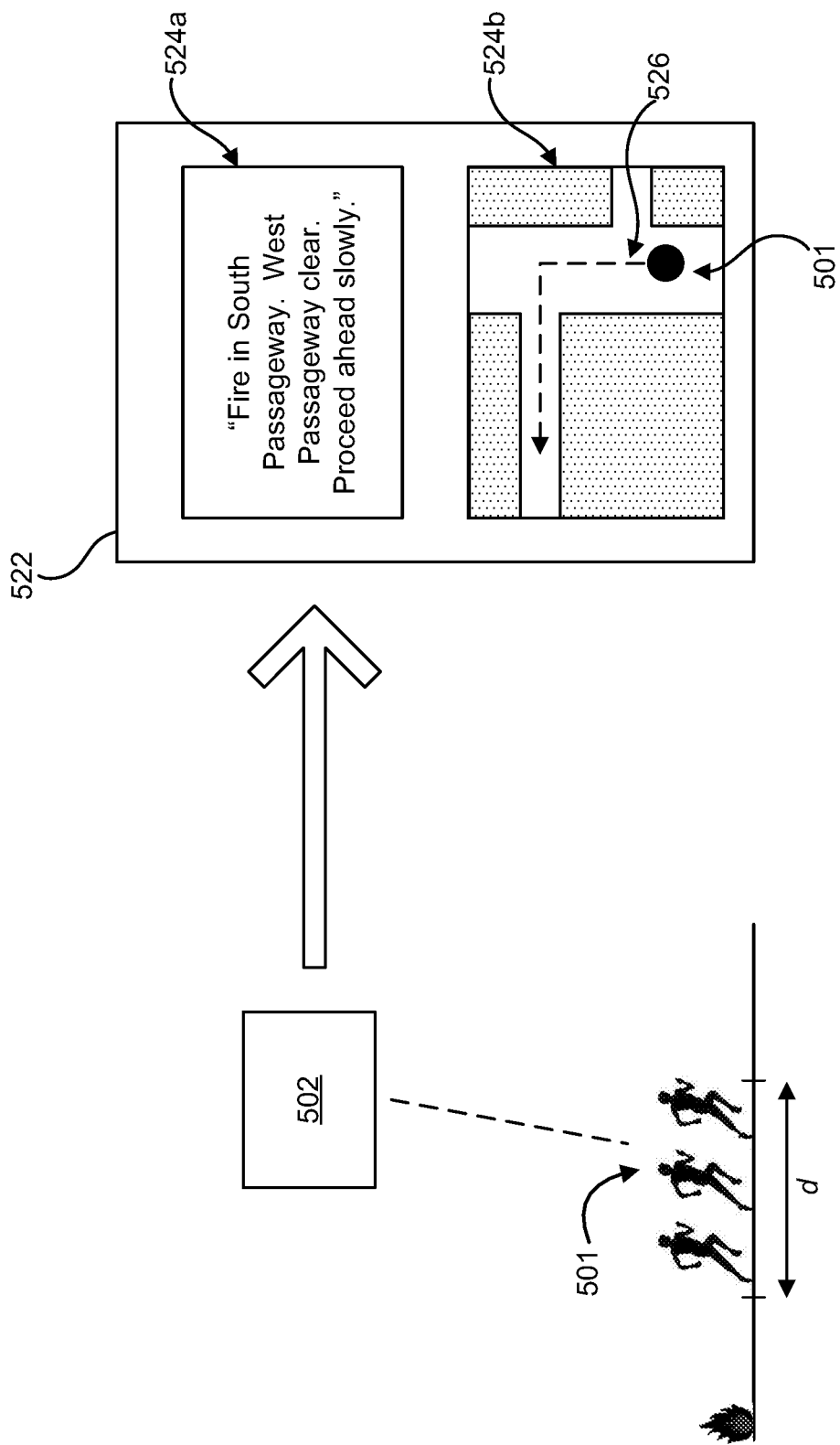
FIG. 5 is a schematic diagram of an exemplary system/method for providing ameliorative action using an unmanned aerial vehicle, in accordance with an embodiment.

Now referring to FIG. 5, an exemplary system/method for providing ameliorative action using an unmanned aerial vehicle is illustratively depicted. As shown in FIG. 5, the unmanned aerial vehicle 502, which may include any of system 100 of FIG. 1, system 200 of FIG. 2, and/or system 300 of FIG. 3, may determine crowd data, such as crowd density data and/or flow information, associated with a plurality of individuals 501 to estimate a crowd pressure estimation value indicative of a likelihood of a crowd event.

In an embodiment, the unmanned aerial vehicle 502 may detect and/or estimate a likelihood of a crowd event when a crowd pressure estimation value associated with the plurality of individuals 501 exceeds a predetermined threshold. For example, a crowd event may be detected/estimated when an amount of individuals, such as the plurality of individuals 501, occupies a particular area d (e.g., persons per square meter). In response to detecting/estimating a likelihood of a crowd event, the unmanned aerial vehicle 502 may perform one or more ameliorative actions to prevent the crowd event and/or aid in the event of a crowd event. For example, the unmanned aerial vehicle 502 may display instructions and/or commands 524a, 524b on a display unit 522, the display unit 522 being mounted to the unmanned aerial vehicle 502. The display unit 522 may display instructions to the plurality of individuals 501, such as proceeding ahead slowing 524a. In another embodiment, the display unit 522 may generate a virtual map 524b to direct the plurality of individuals along a directional route 526 to safety.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
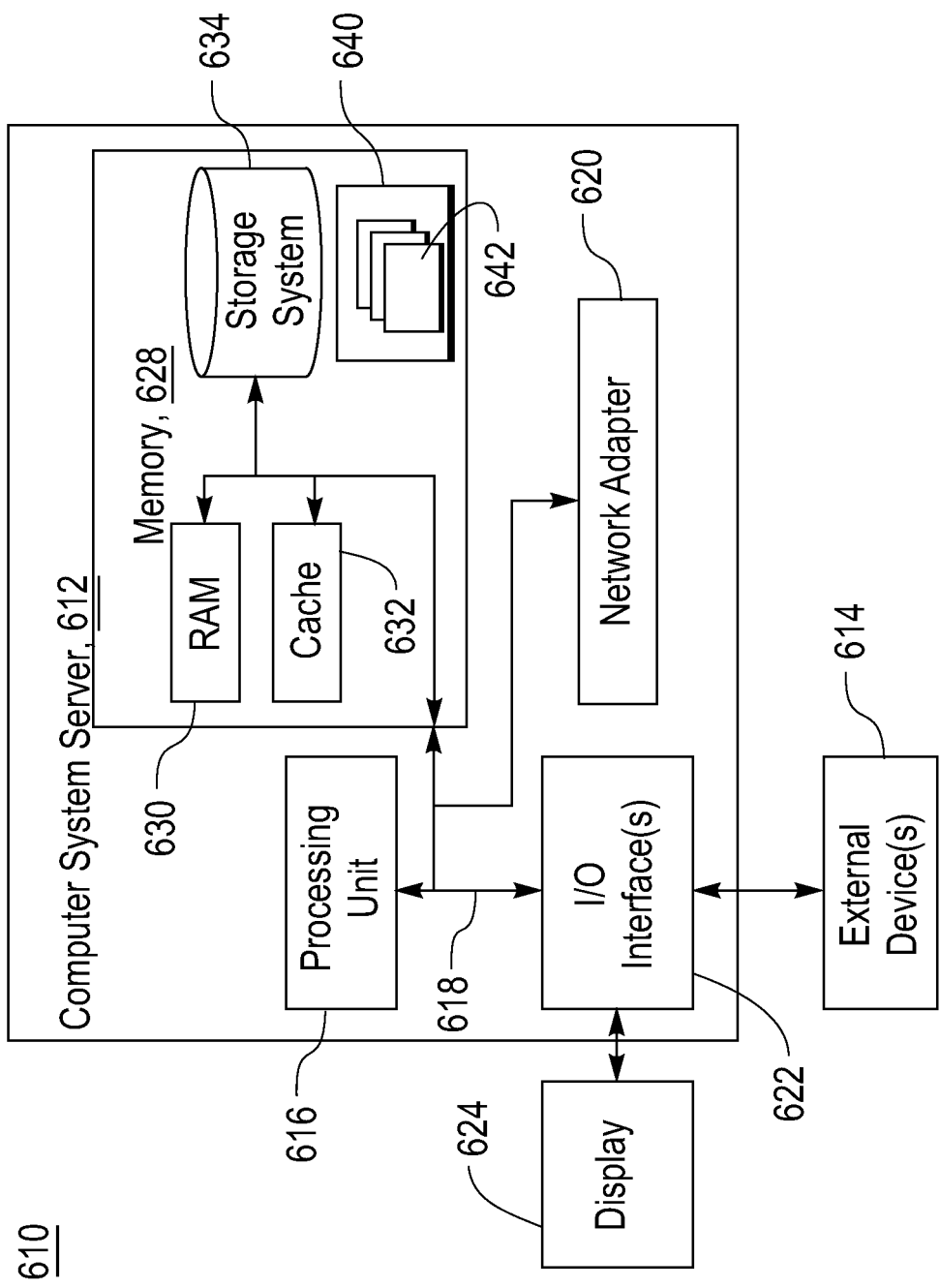
FIG. 6 is a block/flow diagram of an exemplary cloud computing node, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
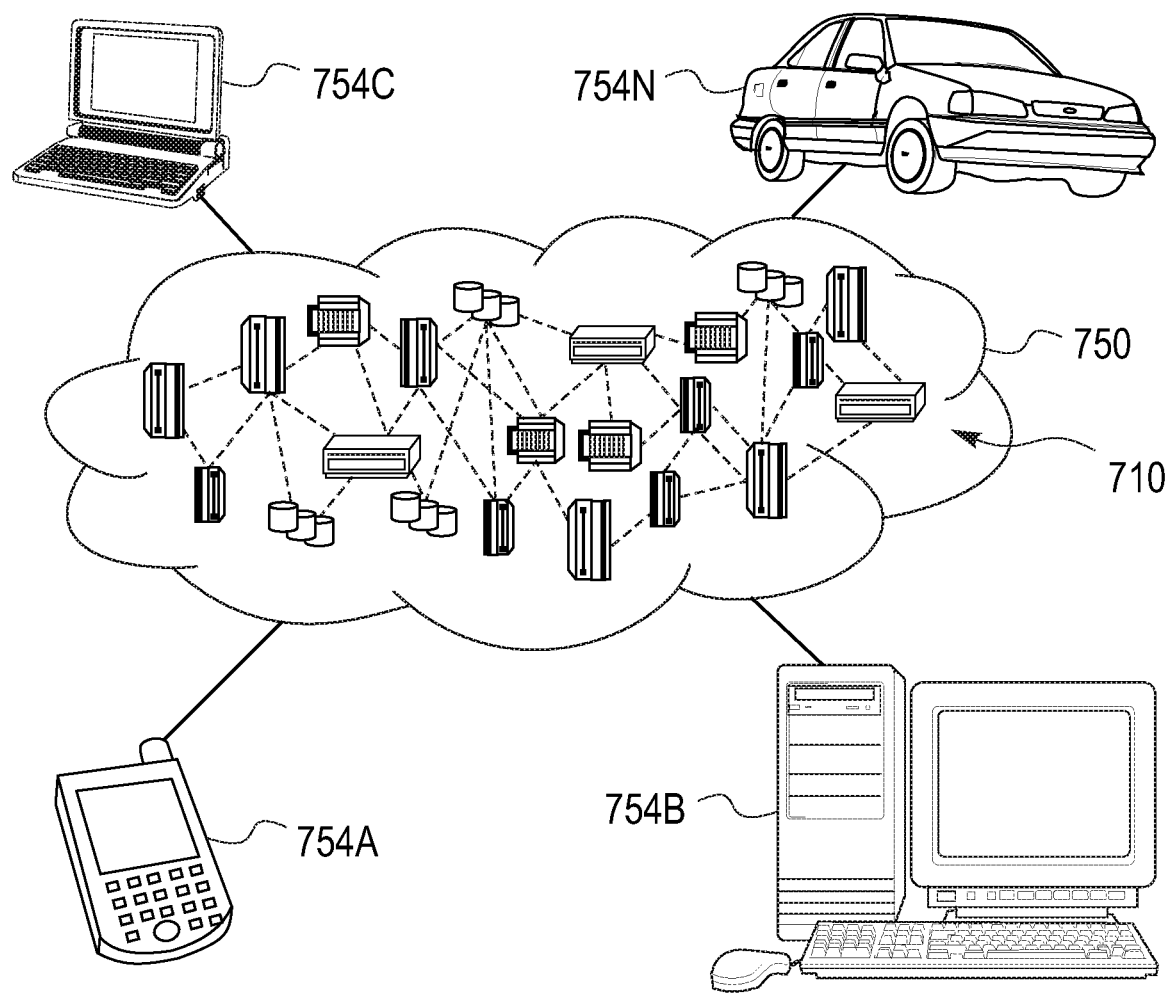
FIG. 7 is a block/flow diagram of an exemplary cloud computing environment, in accordance with an embodiment of the present principles.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
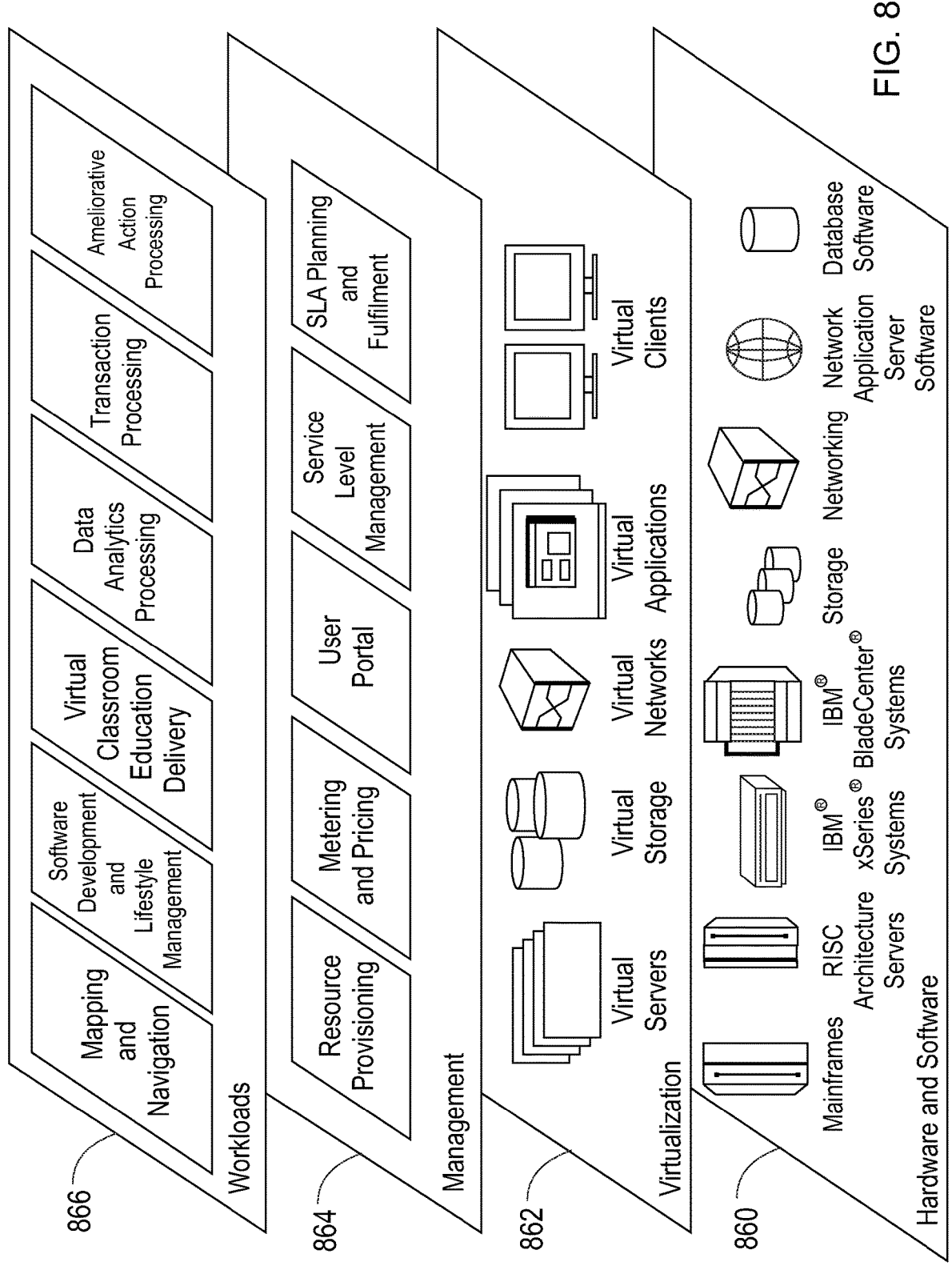
FIG. 8 is a schematic diagram of exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and ameliorative action processing.

Having described preferred embodiments of an unmanned aerial vehicle for crowd event amelioration, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An unmanned aerial vehicle for providing ameliorative action, the unmanned aerial vehicle comprising:
 a processor-based monitoring device disposed on the unmanned aerial vehicle, the monitoring device configured to monitor a plurality of individuals to determine crowd data associated with the plurality of individuals;
 a processor-based crowd estimator disposed on the unmanned aerial vehicle, the crowd estimator configured to receive the crowd data and estimate a crowd pressure estimation value indicative of a likelihood of a crowd event, the crowd pressure estimation value being based on the crowd data; and an ameliorative action device disposed on the unmanned aerial vehicle, the ameliorative action device configured to automatically perform at least one function when the crowd pressure estimation value exceeds a predetermined threshold value, wherein the at least one function includes activating one or more feedback outputs configured to provide an ameliorative action associated with the crowd event.

2. The unmanned aerial vehicle of claim 1, wherein the processor-based monitoring device detects one or more variables from a location associated with the plurality of individuals, the one or more variables being selected from the group consisting of video feedback, audio feedback, floor vibration feedback, and oxygen content feedback.

3. The unmanned aerial vehicle of claim 1, wherein the processor-based monitoring device is further configured to detect emotions of each of the plurality of individuals to determine the crowd data.

4. The unmanned aerial vehicle of claim 1, wherein the crowd estimator is further configured to estimate trajectories of each of the plurality of individuals to estimate the crowd pressure estimation value.

5. The unmanned aerial vehicle of claim 1, wherein the at least one function includes providing an instruction to the plurality of individuals, the instruction being selected from the group consisting of video feedback and audio feedback.

6. The unmanned aerial vehicle of claim 5, wherein the instruction includes generating a virtual map indicating a directional route to safety, the virtual map being displayed on a display unit mounted on the unmanned aerial vehicle.

7. The unmanned aerial vehicle of claim 5, wherein the instruction includes illuminating one or more lights mounted on the unmanned aerial vehicle.

8. The unmanned aerial vehicle of claim 5, wherein the instruction includes a command to separate the plurality of individuals into a plurality of groups such that each group is provided a separate instruction so as to prevent propagation of shockwaves.

9. The unmanned aerial vehicle of claim 1, wherein the at least one function includes emitting an aversive scent to redirect the plurality of individuals from a particular area.

10. The unmanned aerial vehicle of claim 1, wherein:
the processor-based monitoring device is further configured to detect one or more individuals in need of assistance; and
the ameliorative action device is further configured to automatically perform the at least one function for the one or more individuals in need of assistance.

11. A method for providing ameliorative action using an unmanned aerial vehicle, the method comprising:
monitoring, by a processor-based monitoring device mounted on an unmanned aerial vehicle, a plurality of individuals to determine crowd data associated with the plurality of individuals;
estimating, by a processor-based crowd estimator mounted on the unmanned aerial vehicle, a crowd pressure estimation value indicative of a likelihood of a crowd event, the crowd pressure estimation value being based on the crowd data; and
automatically executing at least one function of an ameliorative action device provided on the unmanned aerial vehicle when the crowd pressure estimation value exceeds a predetermined threshold value, wherein the at least one function includes activating one or more feedback outputs configured to provide an ameliorative action associated with the crowd event.

12. The method of claim 11, wherein monitoring includes detecting one or more variables from a location associated with the plurality of individuals, the one or more variables being selected from the group consisting of video feedback, audio feedback, floor vibration feedback, and oxygen content feedback.

13. The method of claim 11, wherein estimating the crowd pressure estimation value includes estimating trajectories of each of the plurality of individuals.

14. The method of claim 11, wherein performing the at least one function includes providing an instruction to the plurality of individuals, the instruction being selected from the group consisting of video feedback and audio feedback.

15. The method of claim 14, wherein providing the instruction includes generating a virtual map indicating a directional route to safety, the virtual map being displayed on a display unit mounted on the unmanned aerial vehicle.

16. The method of claim 14, wherein providing the instruction includes illuminating one or more lights mounted on the unmanned aerial vehicle.

17. A non-transitory computer readable storage medium comprising a computer readable program for providing ameliorative action using an unmanned aerial vehicle, wherein the computer readable program, when executed on a computer, causes the computer to execute:
monitoring, by a processor-based monitoring device mounted on the unmanned aerial vehicle, a plurality of individuals to determine crowd data associated with the plurality of individuals;
estimating, by a processor-based crowd estimator mounted on the unmanned aerial vehicle, a crowd pressure estimation value indicative of a likelihood of a crowd event, the crowd pressure estimation value being based on the crowd data; and
automatically executing at least one function of an ameliorative action device provided on the unmanned aerial vehicle, when the crowd pressure estimation value exceeds a predetermined threshold value, wherein the at least one function includes activating one or more feedback outputs configured to provide an ameliorative action associated with the crowd event.

18. The non-transitory computer readable storage medium of claim 17, wherein monitoring includes detecting one or more variables from a location associated with the plurality of individuals, the one or more variables being selected from the group consisting of video feedback, audio feedback, floor vibration feedback, and oxygen content feedback.

19. The non-transitory computer readable storage medium of claim 17, wherein performing the at least one function includes providing an instruction to the plurality of individuals, the instruction being selected from the group consisting of video feedback and audio feedback.

20. The non-transitory computer readable storage medium of claim 19, wherein providing the instruction includes generating a virtual map indicating a directional route to safety, the virtual map being displayed on a display unit mounted on the unmanned aerial vehicle.

* * * * *